United States Patent Office 2,887,051
Patented May 19, 1959

2,887,051

MARKING OF HEAT-STABLE OBJECTS

Claude Alfred Maunder, Neasden, London, England, assignor to Masson Seeley and Company Limited, London, England, a British company No Drawing. Application September 4, 1956
Serial No. 607,601

Claims priority, application Great Britain
September 30, 1955

4 Claims. (Cl. 101—426)

This invention is concerned with improvements in or relating to the marking of heat-stable objects, particularly hard metals by a blocking or heat-transfer operation.

By the term "blocking operation" is meant an operation which comprises transferring a thermoplastic layer of a transfer foil in a desired pattern onto an object to be marked by the action of a heated die. Such a transfer foil comprises, for example glassine paper or regenerated cellulose coated with a thermoplastic layer, which may be pigmented, and which is transferable under the combined action of heat and pressure. Such foils are often termed blocking foils.

It is usual practice, when carrying out a blocking operation to use a heated die having raised portions corresponding to the pattern to be marked which is applied with sufficient pressure, to effect the blocking operation under the combined action of heat and pressure. The heating of the die is usually effected by heating the platen which carries the die but it is also known to heat the die indirectly, for example by mounting the die on an unheated lower platen, the work to be treated being placed on a heated upper platen, the die thus being heated through the work to be treated. Such a method of heating the die indirectly has, however, only been used where it is desirable to mark show-cards, tickets, and the like which may, for example be of cardboard and like materials but which are non-metallic.

When it is attempted to mark objects made of a hard metal and of materials of comparable hardness, for example glass and ceramic ware, certain problems arise. In particular the marking of hard metals by a blocking operation has been particularly troublesome, and attempts to mark a hard metal using a metallic die have not given satisfactory results no marking being obtained on untreated metal surfaces.

It has now been found that if a die is used which is made of a hard but resilient material and the object to be marked is preheated the die being used cold, then successful marking of objects made of metal and of materials of comparable hardness can be achieved. It will be clear that the present process can only be applied to the marking of objects which are made of a material which is sufficiently heat stable to stand being heated to the temperature necessary to effect the blocking operation, and such objects are for convenience referred to herein as "heat stable objects."

According to the invention, therefore, there is provided a method of marking heat-stable objects, made of a hard metal and of materials of comparable hardness, by a blocking or heat transfer operation comprising the steps of preheating the objects to be marked, applying a blocking foil thereto and causing the desired marking to be transferred to said objects by application to said foil of a cold die made of a hard but resilient non-metallic material.

Whether the material of which the die is made has suitable resilience and hardness successfully to effect the blocking operation can readily be determined by experiment. This material must have sufficient resilience to enable good contact between the raised portions of the die and the applied foil thus insuring an even transfer of the portions of the thermoplastic layer underlying the raised portions to the object to be marked. The material must of course be sufficiently hard so that the die is not distorted or altered during the blocking operation. It has been found that suitable materials for the production of dies of use according to the present invention are, for example, various thermo-setting plastics, such as phenol-formaldehyde and urea-formaldehyde plastics in particular "Bakelite"; other plastics such as those sold under the names of "Formica," "Traffolyte" and "Paxolin" may also be used; other materials such as linoleum may also be used.

Whilst it is not desired to restrict the process of the invention by a theoretical explanation, it is believed that failure to mark hard metallic objects using metallic dies has been due to lack of resilience in the metallic dies, which do not make a true contact with the surface to be marked. By using dies with more resilience, as in the process of the present invention, it seems that a truer contact occurs between the die and the material to be marked, thus resulting in a successful marking operation.

The dies according to the invention may be made in any suitable manner. Thus in the case where the die is to be made of thermo-setting plastic it may be moulded and then finished in any suitable manner. Alternatively the material may be made into the die by milling, grinding or any other machining process.

The preheating of the objects to be marked may be effected by any suitable method. Thus where the objects to be treated are of metal they may, for example, be heated by electric or electronic methods, by exposure to infra-red rays etc. Where the object to be marked is metal strip, this may conveniently be preheated in a heated runway leading to the press.

The temperature to which the objects to be marked should be preheated is dependent upon the heat loss which may occur in the time lapse between the preheating and the marking operation. This heat loss will depend upon such factors as the distance between the preheating unit and the press, and the time lapse between the preheating and marking operation. In any case the temperature to which the object is preheated should be such that its temperature in the press is sufficient to effect the blocking operation. For the marking of metal objects, it is preferred that this temperature lie within the range 100–130° C. It may be advantageous to heat the objects to be marked in the press to maintain them at the temperature necessary to effect the blocking operation, but such heating may, however, not be necessary.

It is to be noted that by the process of the present invention it is possible to carry out a blocking operation which directly marks hard metallic objects such as hacksaw blades, steel strips, metal rulers, name plates, tin lids and boxes, hard metal tubing and like objects, without any special preliminary temperature, which has hitherto been necessary.

In order that the invention may be well understood the following examples are given by way of illustration only:

*Example 1*

To mark steel tape a die made of a thermo-setting plastic can be used. Suitable thermo-setting plastics are for example plastics sold under the trade names "Bakelite," "Formica" and "Traffolyte."

The steel tape to be marked is fed through a marking machine at the rate of approximately 6,000 feet per hour. The tape is heated, before marking, by passage through a heated chamber or by contact with a heated surface, the temperature to which it is heated being such that when the tape reaches the site of the marking operation it has a temperature of approximately 110–120° C. A suitable heating chamber can be, for example, a series of enclosed heating units in juxtaposition through which the tape is passed in succession, the necessary temperature being imparted to the tape by regulating the number of heating units in operation.

The tape, at a temperature of approximately 110–120° C., is marked by the marking head of the machine which carries the plastic die, the movement of the marking head being synchronised with a momentary stoppage of the tape so that the tape is not moving when the die is in contact with it. The die is operated cold, and is mounted on a spring loaded die holder when attached to the marking head in order to take up possible variation in thickness tolerance between one tape and another.

*Example 2*

To mark steel rods or tubes the procedure set out in Example 1 is followed, suitable modifications being made for the shape of the material being treated. Thus, when marking rods and tubes, it is necessary to use a curved die to conform to the curvature of that part of the rod or tube being marked. Similarly the heating chamber for heating the rod or tube should be modified to take into account the curvature and thickness of the rod or tube. Thus the heating surface may be curved to approximate that of the rod or tube being heated.

*Example 3*

To mark steel blades, for example saw blades, and metal plates these articles may be placed on a moving conveyor which moves over a heated surface, the time of contact with the heated surface being such that the articles are at a temperature of approximately 110–120° C. by the time they reach the site of the marking operation. The movement of the articles into the marking zone is synchronised with the movement of the marking head bearing the cold plastic die so that correct registration of the die with the article to be marked is ensured.

I claim:

1. A method of marking an object composed of a hard material selected from the group consisting of a hard metal, glass and ceramic, which method employs a transfer foil having a marking layer capable of being released by the application of pressure at an elevated temperature and which method comprises: preheating the object to be marked to a temperature at least as high as that required to release said transfer layer; applying said transfer foil to said object while said object is at a temperature sufficiently high to effect transfer of said marking layer to said object; and pressing a cold die having raised portions corresponding to the pattern to be marked against said transfer foil applied to said heated object to mark said object, said die being formed of a hard, non-metallic material having sufficient resilience to provide good contact of said raised portions with the applied foil to insure an even transfer of the portion of said marking layer underlying said raised portions to the object being marked.

2. A method as claimed in claim 1 in which said cold die is made of a thermo-setting plastic.

3. A method as claimed in claim 2 in which said thermo-setting plastic is selected from the group consisting of phenol-formaldehyde and urea-formaldehyde plastics.

4. A method of marking a hard metal strip, which method employs a transfer foil having a marking layer capable of being released by the application of pressure at an elevated temperature and which method comprises: feeding the metal strip along a heated runway to preheat it to a temperature at least as high as that required to release said transfer layer; momentarily stopping said metal strip; applying said transfer foil to said metal strip each time that it is stopped and while it is at a temperature sufficiently high to effect transfer of said marking layer to said strip; and, while said strip is stopped, pressing a cold die having raised portions corresponding to the pattern to be marked against said transfer foil applied to said heated strip to mark said strip, said die being formed of a hard, non-metallic material having sufficient resilience to provide good contact of said raised portions with the applied foil to insure an even transfer of the portion of said marking layer underlying said raised portions to the strip being marked.

References Cited in the file of this patent

UNITED STATES PATENTS

| | | |
|---|---|---|
| 543,607 | Bates | July 30, 1895 |
| 1,377,514 | Novatny | May 10, 1921 |
| 1,379,433 | Yeoell | May 24, 1921 |
| 1,496,331 | Wheelock | June 3, 1924 |
| 2,186,788 | Olson | Jan. 9, 1940 |
| 2,306,256 | Wickwire et al. | Dec. 22, 1942 |
| 2,480,455 | Eichner | Aug. 30, 1949 |
| 2,811,917 | Riddle | Nov. 5, 1957 |

FOREIGN PATENTS

| | | |
|---|---|---|
| 495,420 | Great Britain | Nov. 14, 1938 |